United States Patent
Tsutsumi et al.

(10) Patent No.: US 11,267,966 B2
(45) Date of Patent: Mar. 8, 2022

(54) SLURRY COMPOSITION, CURED PRODUCT OF THE SLURRY COMPOSITION, AND SUBSTRATE, FILM AND PREPREG USING THE CURED PRODUCT

(71) Applicant: Shin-Etsu Chemical Co., Ltd., Tokyo (JP)

(72) Inventors: Yoshihiro Tsutsumi, Annaka (JP); Hiroyuki Iguchi, Annaka (JP); Yuki Kudo, Annaka (JP); Atsushi Tsuura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 224 days.

(21) Appl. No.: 16/828,525

(22) Filed: Mar. 24, 2020

(65) Prior Publication Data
US 2020/0317916 A1  Oct. 8, 2020

(30) Foreign Application Priority Data

Apr. 5, 2019 (JP) .............................. JP2019-072411

(51) Int. Cl.
| | | |
|---|---|---|
| C08L 79/08 | (2006.01) | |
| C08K 3/36 | (2006.01) | |
| C08J 5/24 | (2006.01) | |
| C08J 5/18 | (2006.01) | |

(52) U.S. Cl.
CPC ............ C08L 79/08 (2013.01); C08J 5/18 (2013.01); C08J 5/24 (2013.01); C08K 3/36 (2013.01); *C08K 2201/005* (2013.01)

(58) Field of Classification Search
CPC ..... C08L 79/08; C08J 5/18; C08J 5/24; C08K 3/36
See application file for complete search history.

(56) References Cited

U.S. PATENT DOCUMENTS

| | | | |
|---|---|---|---|
| 10,793,712 B2 * | 10/2020 | Tsutsumi | ............... H01L 23/296 |
| 2018/0009195 A1 | 1/2018 | Takeuchi et al. | |
| 2019/0355638 A1 * | 11/2019 | Tsutsumi | ............... C08K 3/013 |
| 2021/0054152 A1 * | 2/2021 | Tsutsumi | ................ B32B 5/022 |
| 2021/0189043 A1 * | 6/2021 | Horigome | ................ C08K 9/06 |

FOREIGN PATENT DOCUMENTS

| | | |
|---|---|---|
| JP | 2010-59363 A | 3/2010 |
| JP | 2010-275342 A | 12/2010 |
| JP | 2012-255059 A | 12/2012 |
| JP | 2017-125128 A | 7/2017 |
| WO | WO 2016/114287 A1 | 7/2016 |

\* cited by examiner

*Primary Examiner* — Edward J Cain
(74) *Attorney, Agent, or Firm* — Birch, Stewart, Kolasch & Birch, LLP

(57) ABSTRACT

Provided are a slurry composition having a low thixotropy and a superior handling property; a cured product of this slurry composition; and a substrate, film and prepreg using such cured product, the substrate, film and prepreg exhibiting excellent mechanical properties and a low relative permittivity and dielectric tangent. The slurry composition has a thixotropic ratio of not higher than 3.0, and comprises:
(A) a cyclic imide compound having, per molecule, at least one dimer acid backbone, at least one linear alkylene group having not less than 6 carbon atoms, and at least two cyclic imide groups;
(B) spherical silica fine particles and/or alumina fine particles having an average particle size of 0.05 to 20 μm when measured by a laser diffraction method;
(C) a silane coupling agent capable of reacting with the components (A) and (B); and
(D) an organic solvent.

9 Claims, No Drawings

SLURRY COMPOSITION, CURED PRODUCT OF THE SLURRY COMPOSITION, AND SUBSTRATE, FILM AND PREPREG USING THE CURED PRODUCT

BACKGROUND OF THE INVENTION

Field of the Invention

The present invention relates to a slurry composition; a cured product of this slurry composition; and a substrate, film and prepreg using such cured product.

Background Art

There has been generally employed a method for producing a resin molded product such as a sheet or a film by applying a resin dissolved in an organic solvent. Further, in order to improve the properties of such resin molded product which are, for example, mechanical strength, heat resistance and non-absorbability, a filler(s) comprised of oxide particles are often to be dispersed in a matrix resin so as to highly fill the same.

In a case where the filler is to be dispersed in a matrix resin so as to highly fill the same, a conventional and mainstream method is, for example, a method in which the filler is at first directly thrown into the matrix resin dissolved in an organic solvent, and a kneader and/or a disperser such as a gate mixer and a triple roll mill are then used to perform kneading and dispersion. However, the problem with such method is that when the particles of the filler are small, it will be difficult to disperse the filler in the matrix resin such that aggregates of the filler particles will be formed in the matrix resin, and that the quality of the matrix resin with the filler being dispersed therein may vary readily.

Meanwhile, as for mobile communication devices such as mobile phones; devices for base stations of such mobile communication devices; network infrastructure devices such as servers and routers; and electronic devices such as large-scale computers, an increase in the rate of the signal(s) used therein and a high increase in the capacities thereof have become significant year after year. In this regard, printed-wiring boards installed in these electronic devices are required to be compatible with high frequencies such those in the 20 GHz region; desired is a substrate material that has a low relative permittivity and a low dielectric tangent, and is thus capable of reducing transmission loss. In recent years, as an application dealing with such high-frequency signal(s), other than the abovementioned electronic devices, a plan for putting a novel system dealing with high-frequency signals into practical use is under way even in the field of intelligent transport system and the field of indoor short-range communication; it is assumed that a low-transmission-loss substrate material will be desired more even for use in the printed-wiring boards installed in these devices.

Conventionally, polyphenylene ether (PPE)-based resins have been used in printed-wiring boards requiring low transmission loss, as heat-resistant and thermoplastic polymers exhibiting low relative permittivities and low dielectric tangents even in a high-frequency region. As a method for using a polyphenylene ether-based resin, there has been proposed a method where polyphenylene ether and a heat-curable resin are used in combination (JP-A-2010-059363 and JP-A-2010-275342). Here, although a fluorinated resin is also known and used as a material exhibiting a low relative permittivity and a low dielectric tangent, it has a defect of being inferior in workability.

Further, as a material for a printed-wring board, the usage of a maleimide compound is also being considered. For example, there is known a resin composition comprising a maleimide compound having at least two maleimide backbones; an aromatic diamine compound having at least two amino groups and an aromatic ring structure; a basic group- and phenolic hydroxyl group-containing catalyst for promoting the reaction between the maleimide compound and the aromatic diamine compound; and a silica (JP-A-2012-255059). In addition, there is also known a resin composition comprising: a long-chain alkyl bismaleimide resin having a main chain including an alkylene chain having not less than 10 carbon atoms, and a side chain containing alkyl groups bonded to the aforesaid alkylene chain; and a curing agent having at least two functional groups capable of reacting with the aforesaid long-chain alkyl bismaleimide resin (WO 2016-114287).

Given these circumstances, as a method for producing a resin film used for the production of a printed-wiring board for a millimeter-wave radar, there is known a method where a maleimide group-containing compound and an inorganic filler slurry are to be mixed together (JP-A-2017-125128). However, with this method, the mixture of the maleimide group-containing compound and the inorganic filler slurry may, for example, exhibit a high thixotropy such that the mixture itself may have a poor handling property readily. For example, unless an appropriate material, surface treatment method and the like are selected, a high thixotropy will be exhibited such that when producing a thin film or the like, thin-film coating becomes difficult as a high shear stress shall be applied to a narrow gap between a blade and a release film.

SUMMARY OF THE INVENTION

Therefore, it is an object of the present invention to provide a slurry composition having a low thixotropy and a superior handling property; a cured product of this slurry composition; and a substrate, film and prepreg using such cured product, the substrate, film and prepreg exhibiting excellent mechanical properties and a low relative permittivity and dielectric tangent.

The inventors of the present invention diligently conducted a series of studies to solve the aforementioned problems, and completed the invention as follows. That is, the inventors found that the following slurry composition could achieve the abovementioned objectives.

[1]

A slurry composition having a thixotropic ratio of not higher than 3.0, containing:

(A) a cyclic imide compound having, per molecule, at least one dimer acid backbone, at least one linear alkylene group having not less than 6 carbon atoms, and at least two cyclic imide groups;

(B) spherical silica fine particles and/or alumina fine particles having an average particle size of 0.05 to 20 µm when measured by a laser diffraction method;

(C) a silane coupling agent capable of reacting with the components (A) and (B); and (D) an organic solvent.

[2]

The slurry composition according to [1], wherein the cyclic imide compound as the component (A) is represented by the following formula (1):

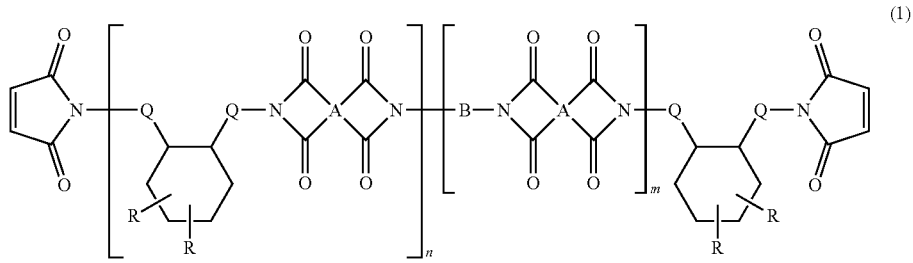

(1)

wherein A independently represents a tetravalent organic group having an aromatic or aliphatic ring; B represents an alkylene chain having 6 to 18 carbon atoms and a divalent aliphatic ring that may contain a hetero atom; Q independently represents a linear alkylene group having not less than 6 carbon atoms; R independently represents a linear or branched alkyl group having not less than 6 carbon atoms; n represents a number of 1 to 10; and m represents a number of 0 to 10.

[3]

The slurry composition according to [2], wherein A in the formula (1) is represented by any one of the following structural formulae:

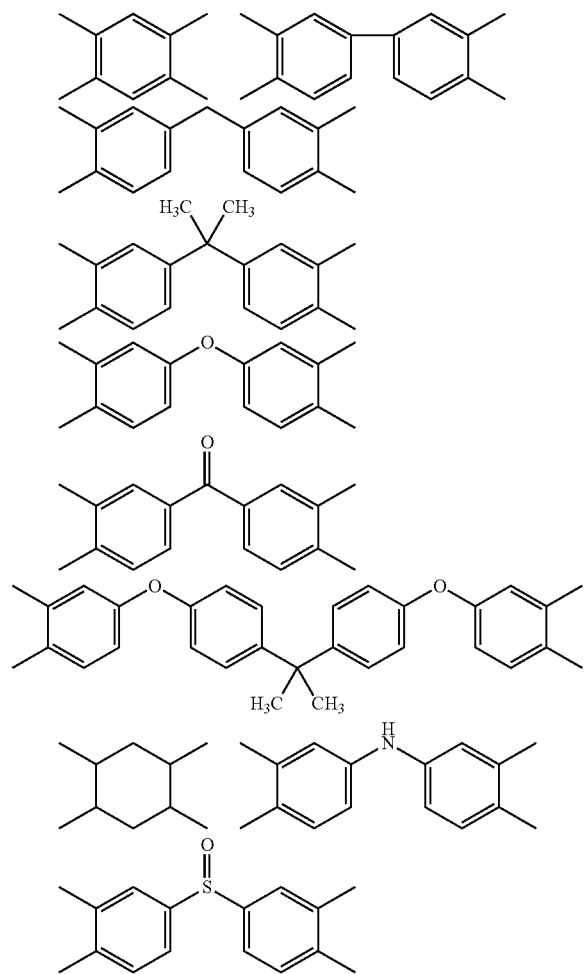

-continued

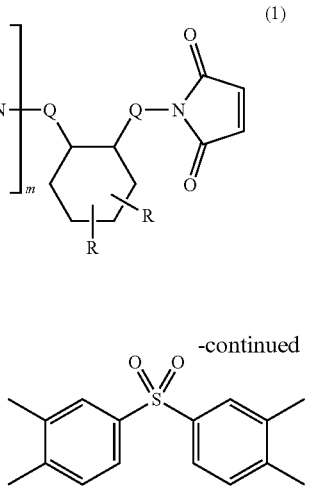

wherein bonds in the above structural formulae that are yet unbonded to substituent groups are to be bonded to carbonyl carbons forming cyclic imide structures in the formula (1).

[4]

The slurry composition according to any one of [1] to [3], wherein the fine particles as the component (B) are contained at a ratio of 30 to 95% by mass with respect to the whole slurry composition.

[5]

The slurry composition according to any one of [1] to [4], wherein the silane coupling agent as the component (C) contains one or more (meth)acrylic groups and/or amino groups.

[6]

A cured product of the slurry composition according to any one of [1] to [5].

[7]

The cured product according to [6], wherein the cured product is a substrate.

[8]

The cured product according to [6], wherein the cured product is a film.

[9]

The cured product according to [6], wherein the cured product is a prepreg.

[10]

A method for producing a slurry composition containing:

(A) a cyclic imide compound having, per molecule, at least one dimer acid backbone, at least one linear alkylene group having not less than 6 carbon atoms, and at least two cyclic imide groups;

(B) spherical silica fine particles and/or alumina fine particles having an average particle size of 0.05 to 20 μm when measured by a laser diffraction method;

(C) a silane coupling agent capable of reacting with the components (A) and (B); and (D) an organic solvent, in which a method for producing the component (B) is VMC (Vaporized Metal Combustion) method.

The slurry composition of the present invention has a low thixotropy and a superior handling property when used to form a film. Further, after turning this composition into a cured product, since the cured product has an excellent physical strength and dielectric property, a substrate, film, prepreg or the like having such cured product is preferable as a material for use in high-frequency devices.

DETAILED DESCRIPTION OF THE INVENTION

The present invention is described in greater detail hereunder.

(A) Cyclic imide compound

A component (A) is a cyclic imide compound as a heat-curable resin component. The cyclic imide compound as the component (A) has, per molecule, at least one dimer acid backbone, at least one linear alkylene group having not less than 6 carbon atoms, and at least two cyclic imide groups. Since the cyclic imide compound as the component (A) has a linear alkylene group(s) having not less than 6 carbon atoms, a cured product of a composition containing such component exhibits not only a superior dielectric property, but also an improved tracking resistance due to a reduced content ratio of phenyl groups. Further, since the cyclic imide compound as the component (A) has a linear alkylene group(s), a cured product of a composition containing such component is able to exhibit a low elasticity.

A maleimide compound is preferred as the cyclic imide compound of the component (A). It is more preferred that a maleimide compound represented by the following formula (1) be used.

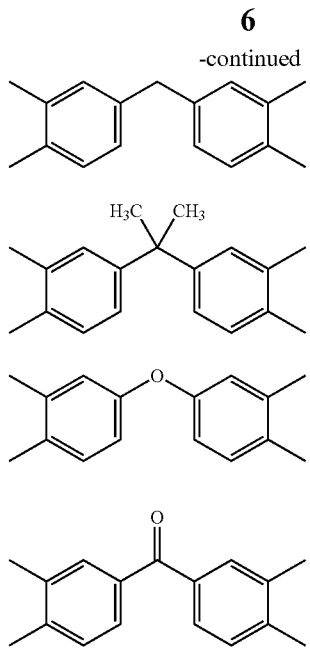

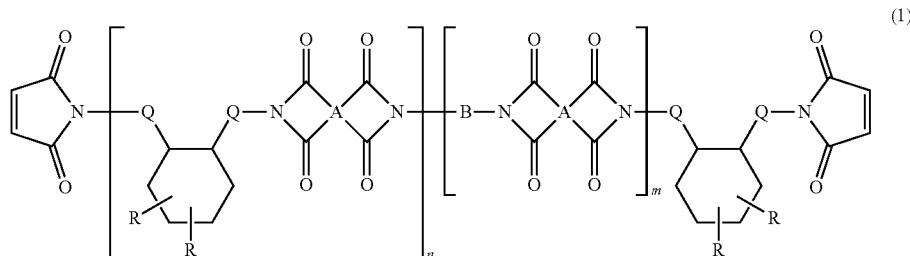

(1)

In the formula (1), A independently represents a tetravalent organic group having an aromatic or aliphatic ring. B represents an alkylene group having 6 to 18 carbon atoms and a divalent aliphatic ring that may contain a hetero atom. Q independently represents a linear alkylene group having not less than 6 carbon atoms. R independently represents a linear or branched alkyl group having not less than 6 carbon atoms. n represents a number of 1 to 10. m represents a number of 0 to 10.

Q in the formula (1) represents a linear alkylene group. These linear alkylene groups each have not less than 6 carbon atoms, preferably 6 to 20 carbon atoms, more preferably 7 to 15 carbon atoms.

Further, R in the formula (1) represents an alkyl group. They may be either linear or branched alkyl groups. The alkyl groups represented by R each have not less than 6 carbon atoms, preferably 6 to 12 carbon atoms.

A in the formula (1) represents a tetravalent organic group having an aromatic or aliphatic ring. Particularly, it is preferred that A be any one of the tetravalent organic groups represented by the following structural formulae.

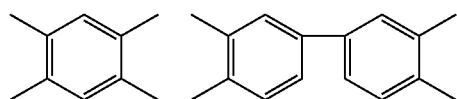

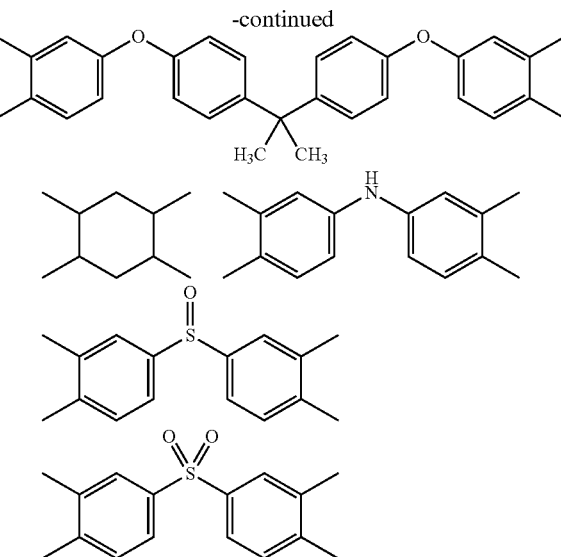

Bonds in the above structural formulae that are yet unbonded to substituent groups are to be bonded to carbonyl carbons forming cyclic imide structures in the formula (1).

Further, B in the formula (1) represents an alkylene group having 6 to 18 carbon atoms and a divalent aliphatic ring that may contain a hetero atom. It is preferred that this alkylene group have 8 to 15 carbon atoms. And, it is preferred that B in the formula (1) be any one of the aliphatic ring-containing alkylene groups represented by the following structural formulae.

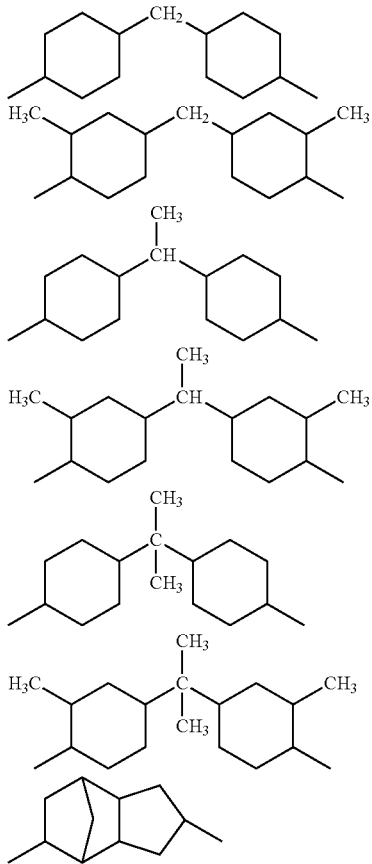

Bonds in the above structural formulae that are yet unbonded to substituent groups are to be bonded to nitrogen atoms forming cyclic imide structures in the formula (1).

n in the formula (1) represents a number of 1 to 10, preferably a number of 2 to 7. m in the formula (1) represents a number of 0 to 10, preferably a number of 0 to 7.

There are no particular restrictions on the weight-average molecular weight (Mw) of the cyclic imide compound as the component (A), as there are no particular restrictions on the properties thereof at room temperature. However, it is more preferred that the weight-average molecular weight of the cyclic imide compound be 500 to 50,000, particularly preferably 800 to 40,000, in terms of polystyrene when measured by gel permeation chromatography (GPC). When such molecular weight is not smaller than 500, an obtained composition containing the cyclic imide compound can be easily turned into a film. When such molecular weight is not larger than 50,000, there exists no concern that a fluidity may be impaired due to an excessively high viscosity of the composition obtained, which results in a favorable moldability when preforming laminate molding, for example.

As the cyclic imide compound of the component (A), there may be used commercially available products such as BMI-689, BMI-1500, BMI-2500, BMI-2560, BMI-3000 and BMI-5000 (by Designer Molecules Inc.). Here, one kind of cyclic imide compound may be used alone, or two or more kinds thereof may be used in combination.

It is preferred that the component (A) be contained in the composition of the present invention by an amount of 10 to 90% by mass, more preferably 15 to 85% by mass, and even more preferably 20 to 80% by mass.

(B) Spherical Silica Fine Particles and/or Alumina Fine Particles Having Average Particle Size of 0.05 to 20 μm when Measured by Laser Diffraction Method The slurry composition of the present invention contains, as a component (B), silica fine particles and/or alumina fine particles. The silica fine particles and/or alumina fine particles are spherical particles having an average particle size of 0.05 to 20 μm when measured by a laser diffraction method. One kind of such silica fine particles and/or alumina fine particles may be used alone, or two or more kinds thereof may be used in combination. Here, the term "spherical" in the present invention refers to a condition where a sphericity is in a range of 0.8 to 1.0. This sphericity is an average value of a ratio of minimum diameter/maximum diameter of each fine particle when 100 fine particles were randomly extracted for calculation. Although there are no particular restrictions on the shapes of these fine particles, those having true spherical shapes are preferred in terms of, for example, a filling property.

It is required that the silica fine particles and/or alumina fine particles of the present invention have an average particle size of 0.05 to 20 μm, preferably 0.05 to 15 μm, and even more preferably 0.1 to 10 μm, when measured by a laser diffraction method. It is not preferable when such average particle size is smaller than 0.05 μm, because a moldability will be impaired due to an increase in viscosity. It is also not preferable when such average particle size is greater than 20 μm, because a flatness of a composition such as a film will deteriorate. Here, the average particles size refers to a value of a median diameter ($D_{50}$) measured by a laser diffraction method.

There are no particular restrictions on a method for producing the above silica fine particles and alumina fine particles. However, it is preferred that these particles be produced by VMC (Vaporized Metal Combustion) method. VMC method is a method for producing oxide fine particles by generating a chemical flame in an oxygen-containing atmosphere, using a burner; and then throwing into such chemical flame a metal powder composing part of target oxide fine particles to cause a deflagration, the metal powder thrown into the chemical flame being in an amount enough to form a dust cloud.

The mechanism of VMC method is described below. In the beginning, a container is to be filled with an oxygen-containing gas as a reactant gas, and a chemical flame is then generated in this reactant gas. Next, a metal powder will be thrown into such chemical flame to form a highly concentrated dust cloud (500 $g/m^3$ or higher). As a result, a thermal energy will be supplied to the surface of the metal powder due to the chemical flame, whereby a surface temperature of the metal powder will increase, and a vapor will then diffuse peripherally from the surface of the metal powder. Ignition occurs as this vapor reacts with the oxygen gas, whereby a flame will be generated. A heat generated by such flame will further promote the gasification of the metal powder, and a vapor generated will then be mixed with the reactant gas so as to propagate ignition in the form of a chain reaction. At that time, the metal powder itself will also undergo destruction and then be scattered to promote flame propagation. A cloud of oxide fine particles will then be formed after the combustion, as a result of having a produced gas cooled naturally. The oxide fine particles obtained can be electrically charged and then captured by an electric dust collector or the like.

VMC method utilizes the principle of dust explosion, where a large amount of oxide fine particles can be obtained instantaneously, and these fine particles exhibit a significantly high sphericity. For example, a silicon powder may be thrown into the flame if producing silica fine particles; an aluminum powder may be thrown into the flame if producing alumina fine particles. By adjusting, for example, the flame temperature, the particle size and amount of the powder to be thrown into the flame, the particle size of the fine particles can be adjusted, and even ultrafine particles with a particle size of submicron order can be produced easily.

The fine particles as the component (B) are contained at a ratio of 30 to 95% by mass, preferably 35 to 90% by mass, with respect to the whole slurry composition. When such ratio is lower than 30% by mass, not only the fine particles will precipitate easily, but cissing tends to occur easily at the time of performing coating. When such ratio is higher than 95% by mass, the composition tends to exhibit an excessively high viscosity and an impaired handling property accordingly.

(C) Silane Coupling Agent Capable of Reacting with Components (A) and (B)

As a component (C), a silane coupling agent capable of reacting with the cyclic imide compound as the component (A) and the silica fine particles and/or alumina fine particles as the component (B) is used in the slurry composition of the present invention. Examples of such coupling agent include an epoxy group-containing alkoxysilane, an amino group-containing alkoxysilane, a (meth)acrylic group-containing alkoxysilane and an unsaturated alkyl group-containing alkoxysilane.

Among these examples, preferred are a (meth)acrylic group and/or amino group-containing alkoxysilane in terms of, for example, lowering the viscosity and thixotropy of the slurry composition, improving a mechanical strength and dielectric property of a cured product of the composition, or even improving an adhesion of the composition to a metal such as copper. Specific examples of the component (C) include 3-methacryloxypropyltrimethoxysilane, 3-acryloxypropyltrimethoxysilane, N-phenyl-3-aminopropyltrimethoxysilane, N-2-(aminoethyl)-3-aminopropyltrimethoxysilane and 3-aminopropyltrimethoxysilane.

It is preferred that the component (C) be contained in an amount of 0.1 to 8.0% by mass, particularly preferably 0.3 to 6.0% by mass, with respect to a sum total of the heat-curable resin components such as the component (A). When such amount of the component (C) is smaller than 0.1% by mass, the composition will exhibit an insufficient adhesion effect to a base material, and an insufficient wettability to the silica fine particles and/or alumina fine particles will be observed. Further, when such amount of the component (C) is greater than 8.0% by mass, an extremely low viscosity will be exhibited even after removing a later-described organic solvent as a component (D), which may then cause voids and bleeding from resin surface.

(D) Organic Solvent

The slurry composition of the present invention contains an organic solvent as a component (D). Although there is no limitation on the kind of the organic solvent, it is preferred that the organic solvent be a good solvent to the cyclic imide compound as the component (A). As the component (D), there can be used general organic solvents including, for example, aliphatic hydrocarbons such as hexane and heptane; aromatic hydrocarbons such as xylene and toluene; ketone compounds such as acetone, methylethylketone (MEK) and cyclohexanone; alcohol compounds such as isopropanol (IPA) and n-butanol; ether compounds such as dibutyl ether and tetrahydrofuran (THF); sulfoxide compounds such as dimethylsulfoxide (DMSO); amide compounds such as dimethylformamide (DMF) and N-methyl-2-pyrolidone; and ester compounds such as ethyl acetate and propyleneglycol monomethylether acetate (PGMEA). Here, it is preferred that there be used an aromatic hydrocarbon-based organic solvent such as xylene and toluene in terms of the solubility of the component (A).

It is preferred that the component (D) be added in an amount of 10 to 500 parts by mass, particularly preferably 20 to 200 parts by mass, per 100 parts by mass of a sum total of the components (A) and (B).

Other Additives

Various additives may further be added to the slurry composition of the present invention if necessary. On the premise that the effects of the present invention will not be impaired, such additive(s) may, for example, be a heat-curable resin such as an epoxy resin, an organopolysiloxane, a silicone oil, a thermoplastic resin, a thermoplastic elastomer, an organic synthetic rubber, a light stabilizer, a polymerization inhibitor, a flame retardant, a pigment, a colorant, a curing accelerator, a catalyst and/or an inorganic filler other than silica fine particles and alumina fine particles, if desiring to improve resin properties; or may, for example, be an ion trapping agent if desiring to improve electric properties. Furthermore, a fluorine-containing material or the like may also be added to the slurry composition of the present invention, if desiring to improve dielectric property.

Production of Slurry Composition

When producing the slurry composition of the present invention, there are no particular restrictions on the order in which the components are thrown in and on a method by which they are dispersed. For example, the cyclic imide compound as the component (A), the silica and/or alumina fine particle powder as the inorganic filler as the component (B) and the silane coupling agent as the component (C) may be dispersed in an organic solvent as the component (D); or a varnish may be prepared at first by dissolving the component (A) in the component (D), followed by adding the components (B) and (C) thereto before performing dispersion. Dispersion may be performed using a device such as a triple roll mill, a ball mill, an ultrasonic disperser, various mixers and/or a kneader. Here, in order to avoid the denaturation of the slurry composition, it is preferred that the slurry composition be produced under a non-oxidizing atmosphere such as a nitrogen atmosphere.

The slurry composition of the present invention thus obtained has a thixotropic ratio of not higher than 3.0. When such thixotropic ratio is higher than 3.0, the composition tends to exhibit a poor handling property. For example, unless a proper material(s) and a surface treatment method are employed, a higher degree of thixotropy will be exhibited, which will then make it difficult to perform thin film coating when forming a thin film or the like as a high shear stress shall be applied in a narrow gap between a blade and a release film.

The thixotropic ratio in this case is calculated based on viscosity values that are obtained through measurements at 25° C./5 rpm and 50 rpm using a cone-plate type rotary viscometer (E-type viscometer) described in JIS K 7117-2: 1999.

Thixotropic ratio=(viscosity value measured at 5 rpm [Pa·s])/(viscosity value measured at 50 rpm [Pa·s])

Further, in the above case, it is preferred that the viscosity measured at 25° C./5 rpm be 0.01 to 10 Pa·s; and that the viscosity measured at 25° C./50 rpm be 0.01 to 7.5 Pa·s.

The inorganic filler as the component (B) reacts with the component (C), i.e. the inorganic filler as the component (B) may be surface-treated by the component (C). There are no particular restrictions on a surface treatment method; the surface treatment may be carried out by a method that is normally and generally employed. For example, the component (B) may at first be subjected to a dry treatment, and then thrown into an organic solvent; or the component (B) may be treated in an organic solvent as a way of wet treatment. Further, the component (B) may be added at the same time when the component (A) is added; the order in which the components are added is arbitrary.

For example, after adding a curing accelerator such as a peroxide (radical initiator) to the slurry composition of the present invention, coating can then be performed using such composition via methods such as spraying, roller coating, spin coating, casting or dipping, followed by evaporating the solvent, and then curing the composition, thus allowing the slurry composition of the invention to be turned into a molded product (e.g. substrate, film or prepreg). In such case, the molded product can be used for various purposes; the molded product can be used in, for example, an electronic part, an adhesive agent, a heat-resistant film and a protection film. The molded product is preferable as a material used in high-frequency devices. Here, a preferred condition for the step of evaporating the solvent is 80 to 150° C. for 0.5 to 4 hours; and a preferred condition for the step of curing the slurry composition of the present invention is 150 to 200° C. for 1 to 16 hours.

As for the embodiment(s) of the slurry composition of the present invention, the embodiment described above is merely an example, and the slurry composition of the invention shall not be limited to the abovementioned embodiment. In addition to the composition described in the above embodiment, those skilled in the art may improve and/or modify the slurry composition of the invention in various ways if possible, and the improved and/or modified composition can then be exploited in such manner.

Working Example

The present invention is described in detail hereunder with reference to working and comparative examples. However, the present invention is not limited to the following working examples.

(A) Cyclic imide compound (A-1): Linear alkylene group-containing maleimide compound represented by the following formula (BMI-3000 by Designer Molecules Inc.)

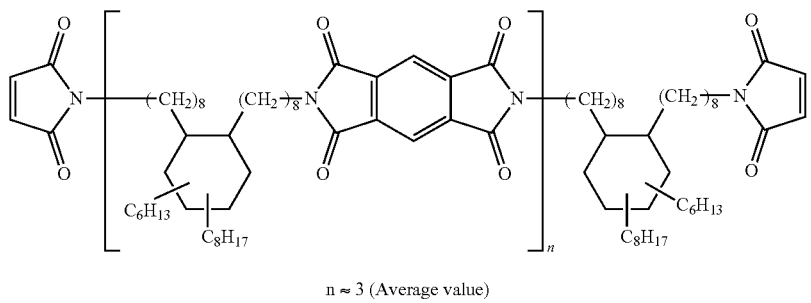

n ≈ 3 (Average value)

(A-2): linear alkylene group-containing maleimide compound represented by the following formula (BMI-2500 by Designer Molecules Inc.)

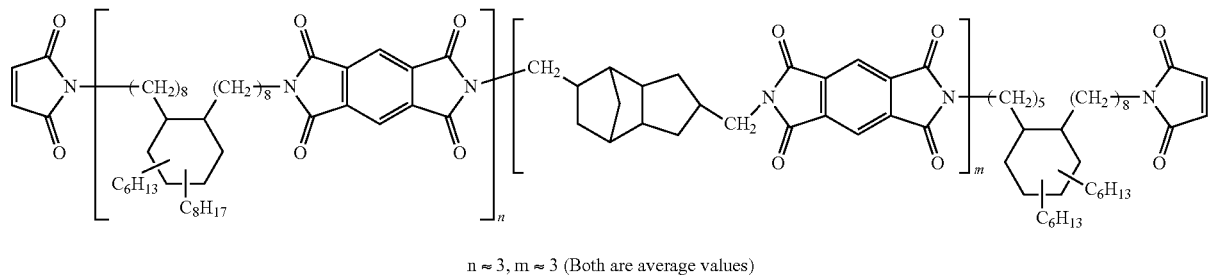

n ≈ 3, m ≈ 3 (Both are average values)

(A-3): 4,4'-diphenylmethanebismaleimide (BMI-1000 by Daiwa Fine Chemicals co., Ltd.; for use in comparative examples)

(B) spherical silica fine particles and/or alumina fine particles having average particle size of 0.05 to 20 μm when measured by laser diffraction method (B-1) Spherical silica (ADMAFINE SO-C5 by Admatechs; produced by VMC method; average particle size 1.5 μm)

(B-2) Spherical alumina (ADMAFINE AO-502 by Admatechs; produced by VMC method; average particle size 0.7 μm)

(B-3) Molten spherical silica (ES-105 by Tokai Minerals; average particle size 35 µm; for use in comparative examples)
(c) silane coupling agent capable of reacting with components (A) and (B)
(C-1) 3-methacryloxypropyltrimethoxysilane (KBM-503 by Shin-Etsu Chemical Co., Ltd.)
(C-2) 3-acryloxypropyltrimethoxysilane (KBM-5103 by Shin-Etsu Chemical Co., Ltd.)
(C-3) N-phenyl-3-aminopropyltrimethoxysilane (KBM-573 by Shin-Etsu Chemical Co., Ltd.)
(C-4) n-hexyltrimethoxysilane (KBM-3063 by Shin-Etsu Chemical Co., Ltd.; for use in comparative examples)
(D) Organic Solvent
(D-1) Toluene Production of Slurry Composition (Working Examples 1 to 8; Comparative Examples 1 to 6)

Each slurry composition was produced at composition ratios (parts by mass) shown in Table 1. The cyclic imide compound as the component (A); the silica fine particles and/or alumina fine particles as the component (B); and the silane coupling agent as the component (C) (not used in comparative examples 1 and 2) were put into the organic solvent as the component (D), followed by using a stirrer to premix them so as to obtain a crude slurry solution. This crude slurry solution was then dispersed in a disperser to produce a slurry composition in which the filler was uniformly dispersed. The following properties of such slurry composition were then measured. The results thereof are shown in Table 1.

Agglutination test

Using a Baker-type applicator, the slurry composition obtained was applied to a 38 µm-thick polyethylene terephthalate (PET) film (G2-38 by TEIJIN LIMITED) as a supporting material, in a manner such that the slurry composition applied would have a thickness of 30 µm and a size of A4 thereon. After performing drying at 120° C., "o" was given to examples where not even one agglomerate was observed visually; whereas "x" was given to examples where one or more agglomerates were observed visually.

Viscosity Measurement, Thixotropic Ratio Calculation

Using a cone-plate type rotary viscometer described in JIS K 7117-2:1999, the slurry composition obtained was subjected to viscosity measurement at 5 rpm and 50 rpm under 25° C. A thixotropic ratio was then calculated based on a viscosity value thus measured, using the following formula.

Thixotropic ratio=(viscosity value measured at 5 rpm [Pa·s])/(viscosity value measured at 50 rpm [Pa·s])

Production of Molded Product (Working Examples 9 to 12; Comparative Examples 7 and 8)

Next, each of the slurry compositions prepared in working examples 1, 2, 3 and 5, and comparative examples 1 and 3 was taken by an amount of 100 parts by mass, and 2 parts by mass of a dicumylperoxide (PERCUMYL D by NOF CORPORATION) was added thereto so as to be dissolved therein. Later, each slurry composition was poured into a Teflon-coated mold for making test specimens, followed by treating the same at 100° C. for an hour to volatilize the organic solvent, and then curing the composition by performing heating at 175° C. for two hours, thus obtaining a 1A-type specimen described in JIS K 7161-2:2014. The following properties were then measured using this specimen. The results thereof are shown in Table 2.

Measurement of Tensile Strength, Tensile Stress and Tensile Strength Strain

In accordance with a method described in JIS K 7161-1:2014, a tensile strength, tensile stress and tensile strength strain were measured at 25° C.

Measurement of Relative Permittivity and Dielectric Tangent

As is the case with the production of the above molded product, each slurry composition was cured to obtain a film having a thickness of 200 µm. Later, a network analyzer (E5063-2D5 by Keysight Technologies) and a stripline (by KEYCOM Corp.) were connected to the film to measure a relative permittivity and dielectric tangent thereof at a frequency of 10 GHz.

TABLE 1

| | | | | Working example | | | | | | | | Comparative example | | | | | |
|---|---|---|---|---|---|---|---|---|---|---|---|---|---|---|---|---|---|
| Composition table (part by mass) | | | 1 | 2 | 3 | 4 | 5 | 6 | 7 | 8 | 1 | 2 | 3 | 4 | 5 | 6 |
| (A) | Cyclic imide compound | BMI-3000 A-1 | 30.0 | 30.0 | 30.0 | | 30.0 | 22.5 | 30.0 | 30.0 | 30.0 | 30.0 | 30.0 | | | 30.0 |
| | | BMI-2500 A-2 | | | | 30.0 | | | | | | | | | | |
| | | BMI-1000 A-3 | | | | | | 7.5 | | | | | | 30.0 | 30.0 | |
| (B) | Inorganic fine particles | SO-C5 B-1 | 70.0 | 70.0 | 70.0 | 70.0 | 70.0 | 70.0 | | | 70.0 | | 70.0 | 70.0 | 70.0 | |
| | | AO-502 B-2 | | | | | | | 70.0 | 70.0 | | 70.0 | | | | |
| | | ES-105 B-3 | | | | | | | | | | | | | | 70.0 |
| (C) | Silane coupling agent | KBM-503 C-1 | 0.5 | | | 0.5 | 0.3 | 0.5 | 0.5 | | | | 0.5 | | | 0.5 |
| | | KBM-5103 C-2 | | 0.5 | | | | | | 0.5 | | | | | | |
| | | KBM-573 C-3 | | | 0.5 | | 0.3 | | | | | | | | 0.5 | |
| | | KBM-3063 C-4 | | | | | | | | | | | | 0.5 | | |
| (D) | Organic solvent | Toluene D-1 | 50.0 | 50.0 | 50.0 | 50.0 | 50.0 | 50.0 | 50.0 | 50.0 | 50.0 | 50.0 | 50.0 | 50.0 | 50.0 | 50.0 |
| Property evaluation | Agglutination test | | o | o | o | o | o | o | o | o | x | x | o | o | o | Silica started to precipitate immediately after vanish was produced |
| | Viscosity(5 rpm) | Pa·s | 2.0 | 2.5 | 1.9 | 1.9 | 1.8 | 3.2 | 3.8 | 3.9 | 5.6 | 5.5 | 3.3 | 19.2 | 13.5 | |
| | Viscosity(50 rpm) | Pa·s | 1.4 | 1.4 | 1.2 | 1.3 | 1.3 | 2.0 | 2.5 | 2.4 | 1.3 | 1.3 | 1.0 | 4.8 | 4.0 | |
| | Thixotropic ratio | | 1.4 | 1.8 | 1.6 | 1.5 | 1.4 | 1.6 | 1.5 | 1.6 | 4.5 | 4.2 | 3.3 | 4.0 | 3.4 | |

TABLE 2

|  |  |  | Working example | | | | Comparative example | |
| --- | --- | --- | --- | --- | --- | --- | --- | --- |
|  |  |  | 9 Working example 1 | 10 Working example 2 | 11 Working example 3 | 12 Working example 5 | 7 Comparative example 1 | 8 Comparative example 3 |
|  | Slurry composition |  |  |  |  |  |  |  |
| Property evaluation | Tensile strength | MPa | 25 | 30 | 19 | 23 | 11 | 8 |
|  | Tensile stress | MPa | 800 | 840 | 610 | 750 | 710 | 740 |
|  | Tensile strength strain | % | 19 | 20 | 26 | 19 | 10 | 8 |
|  | 10 GHz relative permittivity |  | 3.0 | 3.0 | 2.6 | 2.7 | 3.3 | 3.2 |
|  | 10 GHz dielectric tangent |  | 0.0014 | 0.0014 | 0.0010 | 0.0011 | 0.0019 | 0.0017 |

Based on the above results, it became clear that the slurry composition of the present invention had a low thixotropy and was superior in handling property. Further, it also became clear that the film made from such slurry composition had excellent mechanical properties, and a low relative permittivity and dielectric tangent; and that the molded product made from such slurry composition was thus preferable as a material(s) for high-frequency devices.

What is claimed is:

1. A slurry composition having a thixotropic ratio of not higher than 3.0, comprising:
   (A) a cyclic imide compound having, per molecule, at least one dimer acid backbone, at least one linear alkylene group having not less than 6 carbon atoms, and at least two cyclic imide groups;
   (B) spherical silica fine particles and/or alumina fine particles having an average particle size of 0.05 to 20 μm when measured by a laser diffraction method;
   (C) a silane coupling agent capable of reacting with the components (A) and (B); and
   (D) an organic solvent.

2. The slurry composition according to claim 1, wherein the cyclic imide compound as the component (A) is represented by the following formula (1):

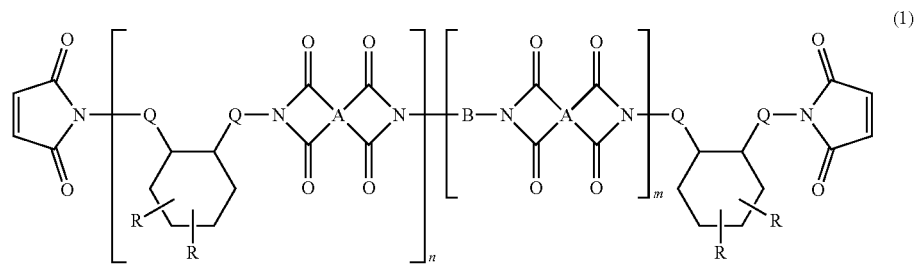

(1)

wherein A independently represents a tetravalent organic group having an aromatic or aliphatic ring; B represents an alkylene chain having 6 to 18 carbon atoms and a divalent aliphatic ring that may contain a hetero atom; Q independently represents a linear alkylene group having not less than 6 carbon atoms; R independently represents a linear or branched alkyl group having not less than 6 carbon atoms; n represents a number of 1 to 10; and m represents a number of 0 to 10.

3. The slurry composition according to claim 2, wherein A in the formula (1) is represented by any one of the following structural formulae:

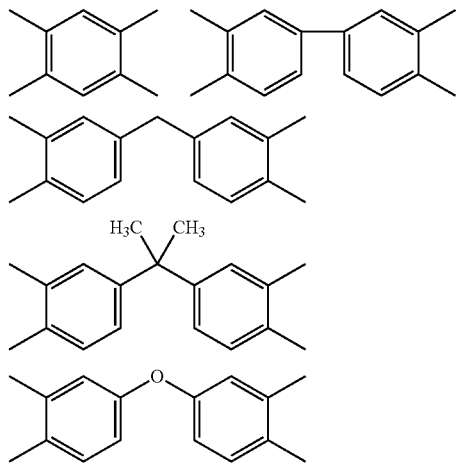

-continued

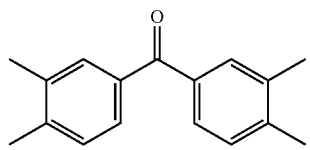

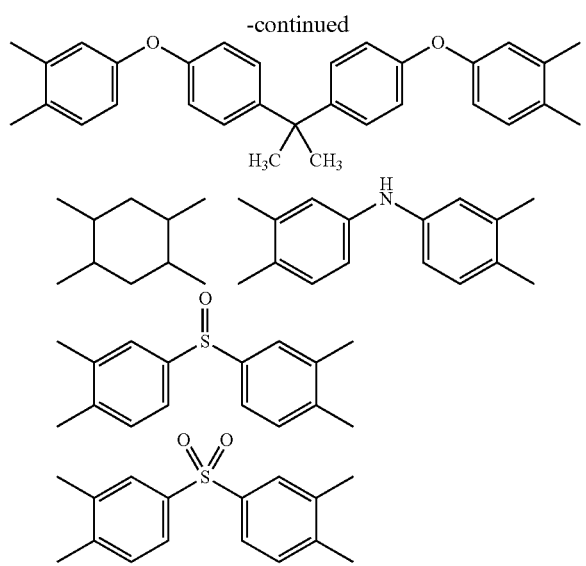

wherein bonds in the above structural formulae that are yet unbonded to substituent groups are to be bonded to carbonyl carbons forming cyclic imide structures in the formula (1).

4. The slurry composition according to claim 1, wherein the fine particles as the component (B) are contained at a ratio of 30 to 95% by mass with respect to the whole slurry composition.

5. The slurry composition according to claim 1, wherein the silane coupling agent as the component (C) contains one or more (meth)acrylic groups and/or amino groups.

6. A cured product of the slurry composition according to claim 1.

7. The cured product according to claim 6, wherein the cured product is a substrate.

8. The cured product according to claim 6, wherein the cured product is a film.

9. The cured product according to claim 6, wherein the cured product is a prepreg.

* * * * *